(12) United States Patent
Bengtsson et al.

(10) Patent No.: US 7,945,246 B2
(45) Date of Patent: May 17, 2011

(54) SYSTEM AND METHOD FOR ESTABLISHING AUTHENTICATED NETWORK COMMUNICATIONS IN ELECTRONIC EQUIPMENT

(75) Inventors: Henrik Bengtsson, Lund (SE); Troed Sangberg, Malmo (SE); Bo Larsson, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 861 days.

(21) Appl. No.: 11/924,883

(22) Filed: Oct. 26, 2007

(65) Prior Publication Data

US 2009/0111424 A1    Apr. 30, 2009

(51) Int. Cl.
   *H04M 3/16* (2006.01)
(52) U.S. Cl. ............ 455/411; 455/466; 455/426.1; 370/352; 726/9
(58) Field of Classification Search .......... 455/411, 455/466, 426.1; 370/352; 726/9
   See application file for complete search history.

(56) References Cited

U.S. PATENT DOCUMENTS

| | | | |
|---|---|---|---|
| 6,442,159 | B2 | 8/2002 | Josse et al. |
| 2003/0096595 | A1* | 5/2003 | Green et al. ............... 455/411 |
| 2003/0128822 | A1 | 7/2003 | Leivo et al. |
| 2004/0082348 | A1 | 4/2004 | Gabriel et al. |
| 2004/0110516 | A1 | 6/2004 | Miralles et al. |
| 2007/0202896 | A1 | 8/2007 | Contreras Alvarez et al. |
| 2008/0127320 | A1* | 5/2008 | De Lutiis et al. ............ 726/9 |
| 2008/0270611 | A1* | 10/2008 | Noldus et al. ............ 709/227 |

FOREIGN PATENT DOCUMENTS

| | | |
|---|---|---|
| EP | 1 102 157 | 5/2001 |
| GB | 2 399 435 | 9/2004 |
| WO | 01/17310 | 3/2001 |
| WO | 03/009616 | 1/2003 |

OTHER PUBLICATIONS

International Search Report and Written Opinion for International Application No. PCT/IB2008/000928 dated Dec. 4, 2008.
International Preliminary Report on Patentability for International Application No. PCT/IB2008/000928 dated Feb. 2, 2010.

* cited by examiner

*Primary Examiner* — Danh C Le
(74) *Attorney, Agent, or Firm* — Renner, Otto, Boisselle & Sklar, LLP

(57) ABSTRACT

A method for establishing an authenticated network connection in a packet-switched network with an electronic equipment, the method including transmitting a request from an electronic equipment through a packet-switched network connection to an authentication server. The authentication server generates a first unique identifier and transmits the first unique identifier to the electronic equipment through the packet-switched network connection. The electronic then transmits a message from the electronic equipment to a short message service (SMS) server through a circuit-switched network connection, wherein the message includes the first unique identifier and a second unique identifier (e.g., a telephone number of the electronic device). The message is routed to the authentication server and authenticated. After authentication, the electronic equipment may utilize a packet-switched connection for a variety of communication services (e.g., chat sessions, voice over Internet Protocol) with other authenticated electronic equipment.

17 Claims, 3 Drawing Sheets

SYSTEM AND METHOD FOR ESTABLISHING AUTHENTICATED NETWORK COMMUNICATIONS IN ELECTRONIC EQUIPMENT

TECHNICAL FIELD OF THE INVENTION

The present invention relates to a system and method for establishing authenticated network communications in electronic equipment and, more particularly, to a system and method for using short message service (SMS) communications to authenticate an electronic equipment and allow further communication between a plurality of electronic equipment through a packet-switched network connection.

DESCRIPTION OF THE RELATED ART

Short Message Service (SMS), also commonly referred to as "text messaging" or "texting", is a way of sending short messages to and from mobile telephones and other electronic devices (wired and wireless). SMS was originally defined as part of the Global System for Mobile (GSM) communications standard as a way of sending messages having a length of up to 160 characters to and from GSM electronic equipment (e.g., mobile telephones). Support for the SMS service has expanded to include alternative mobile networking standards, such as code division multiple access (CDMA) networks, time division multiple access (TDMA) networks, satellite and landline networks, as well as next generation telephony protocols.

An electronic equipment, such as a mobile telephone generally has a unique identity provided by the network operator in the form of telephone number or other such identifier made available on a subscriber identity module (SIM). This identity means that when a user calls a person, the user can be sure that he or she is communicating with a particular person. Thus, the identity is authenticated by the network operator. However, the same principle does not apply for communications using a personal computer. Such communications are generally anonymous, and there this is no network operator that guarantees the identity of a user.

While the use of SMS has become ubiquitous, there are a variety of security issues that prohibit secure communications using SMS. One security issue is "SMS spoofing". In general "spoofing" occurs when a person (or entity) successfully masquerades as another person (or entity) by falsifying data and thereby leading the recipient of a SMS message to believe that they are communicating with one person (or entity) when in reality, they are dealing with another person (or entity). This is often done with a nefarious intent on the part of the spoofing party. SMS spoofing is a relatively new kind of spoofing that uses SMS to spoof or impersonate another user. The spoofing is often used to send viruses that can be carried from electronic equipment to electronic equipment. Such viruses have been known to cause a wide variety of destructive behavior.

SUMMARY

Often times, it is desirable for users of electronic equipment (e.g., mobile telephones, computers, etc.) to have a high degree of certainty that the device and/or person they are sending communications to and/or receiving communications from are actually the device and/or person that they purport to be. This is especially important when dealing with confidential information, financial transactions and the like. It may also be desirable for establishing authenticated network connections in a packet-switched network in order to transfer costly voice communications and/or SMS communications from an expensive circuit-switched network connection. Thus, a need in the art exists for a system and method for establishing an authenticated network connection in a packet-switched network. The authentication substantially guarantees that the electronic equipment transmitting messages and/or receiving messages are who they purport to be.

One aspect of the invention relates to a method for establishing an authenticated network connection in a packet-switched network with an electronic equipment, the method including: transmitting a request from an electronic equipment through a packet-switched network connection to a first server; receiving a first unique identifier from the first server at the electronic equipment through the packet-switched network connection; and transmitting a message from the electronic equipment to a short message service (SMS) server through a circuit-switched network connection, wherein the message includes the first unique identifier and a second unique identifier.

One aspect of the invention relates to the first unique identifier being a random identifier generated by an application associated with the first server.

One aspect of the invention relates to the random identifier being a hash code.

One aspect of the invention relates to the hash code having a length of at least 128 bits.

One aspect of the invention relates to the second unique identifier being a mobile subscriber integrated services digital network number (MSISDN) associated with the electronic equipment.

One aspect of the invention relates to the SMS server transmitting the message to the first server for authentication of the electronic equipment.

One aspect of the invention relates to the first server authenticating the electronic equipment by comparing the first unique identifier with the second unique identifier.

One aspect of the invention relates to transmitting a communication request from the electronic equipment to an associated second electronic equipment through the first server via a packet-switched network connection.

One aspect of the invention relates to establishing a session between the first electronic equipment and the associated second electronic equipment through the packet-switched network connection.

One aspect of the invention relates to the session being at least one selected from the group consisting of a voice over Internet Protocol (VoIP) session, a chat session, or a data session.

One aspect of the invention relates to the electronic equipment being a portable communications device.

One aspect of the invention relates to a method for establishing an authenticated network connection in a packet-switched network with an electronic equipment, the method including: receiving a request from an electronic equipment through a packet-switched network connection at a first server; generating a first unique identifier based at least in part on the packet-switched network connection; transmitting the first unique identifier from the first server to the electronic equipment through the packet-switched connection to the electronic equipment; receiving a message from a short message service (SMS) server through a circuit-switched network, wherein the message includes the first unique identifier and a second unique identifier, wherein the second unique identifier is associated with the electronic equipment; and authenticating the electronic equipment by comparing the first unique identifier with the second unique identifier.

One aspect of the invention relates to the second unique identifier being a mobile subscriber integrated services digital network number (MSISDN) associated with the electronic equipment One aspect of the invention relates to the first unique identifier being a random identifier generated by the application associated with the first server.

One aspect of the invention relates to the random identifier being a hash code.

One aspect of the invention relates to the packet-switched connection utilizes a transport control protocol for communications between the electronic equipment and a second electronic equipment.

One aspect of the invention relates to the electronic equipment being a portable communications device.

One aspect of the invention relates to a method for establishing an authenticated network connection in a packet-switched network with an electronic equipment, the method including: receiving a request from an electronic equipment through a circuit-switched network at a short message service (SMS) server from an electronic equipment, wherein the request includes a first unique identifier generated by a first server in communication with the electronic equipment through a packet-switched connection and a second unique identifier associated with the electronic equipment; and transmitting the request to the first server for authentication of the electronic equipment on the first server.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof."

The term "electronic equipment" includes all equipment such as portable communication devices, mobile telephones, pagers, communicators, electronic organizers, personal digital assistants (PDA's), portable communication apparatus, smart phones or the like.

BRIEF DESCRIPTION OF THE DRAWINGS

The foregoing and other embodiments of the invention are hereinafter discussed with reference to the drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

The present invention is directed to secure communications between electronic equipment. The invention is described primarily in the context of a mobile telephone. However, it will be appreciated that the invention is not intended to relate solely to mobile telephones and can relate to any type of electronic equipment. Other types of electronic equipment that may benefit from aspects of the present invention include personal computers, is personal digital assistants, portable communication devices, etc.

Figure 1:
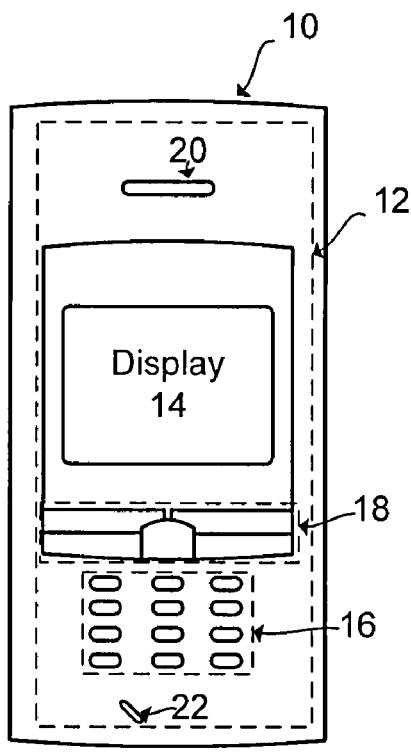
FIGS. 1 and 2 are exemplary schematic diagrams illustrating electronic equipment in accordance with aspects of the present invention.

As illustrated in FIG. 1, the electronic equipment 10 may include a user interface 12 that enables the user easily and efficiently to perform one or more communication tasks (e.g., enter a telephone number, identify a contact, select a contact, make a telephone call, receive a telephone call, look up a telephone number, enter a text message, receive text message, etc). The user interface 12 of the electronic equipment 10 generally includes one or more of the following components: a display 14, an alphanumeric keypad 16, function keys 18, a speaker 20, and a microphone 22.

Figure 2:
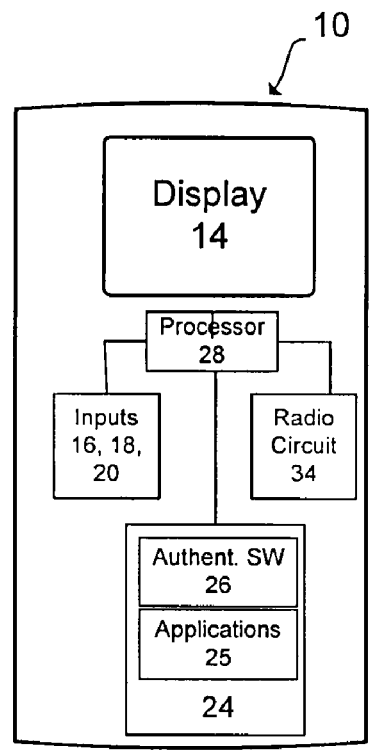

As shown in FIG. 2, the electronic equipment 10 further includes one or more storage devices 24 (e.g., RAM, ROM, etc.) capable of storing application software 25. For example, the application software may include computer executable code that supports short message service, Internet data services, voice services, and multimedia services. In addition, the storage device 24 further includes authentication application software 26 to facilitate authenticated communication over a packet-switched network connection. The application software 25, 26 is generally coupled to a processor 28. The processor 28 is programmed to perform the functionality described herein, for example, creating SMS messages, transmitting SMS messages, receiving SMS messages, transmitting requests, configuring the electronic equipment for communications in various network environments, etc., based on user information and/or commands input by the associated user to the electronic equipment 10.

The processor 28 also is coupled to conventional input devices (e.g., alphanumeric keypad 16, function keys 18, microphone 22, etc.), and to the display 14 and the speaker 20. The user interface 12 facilitates controlling operation of the electronic equipment 10 including initiating and conducting telephone calls and other communications (e.g., SMS communications, Internet communications, etc.).

Figure 3:
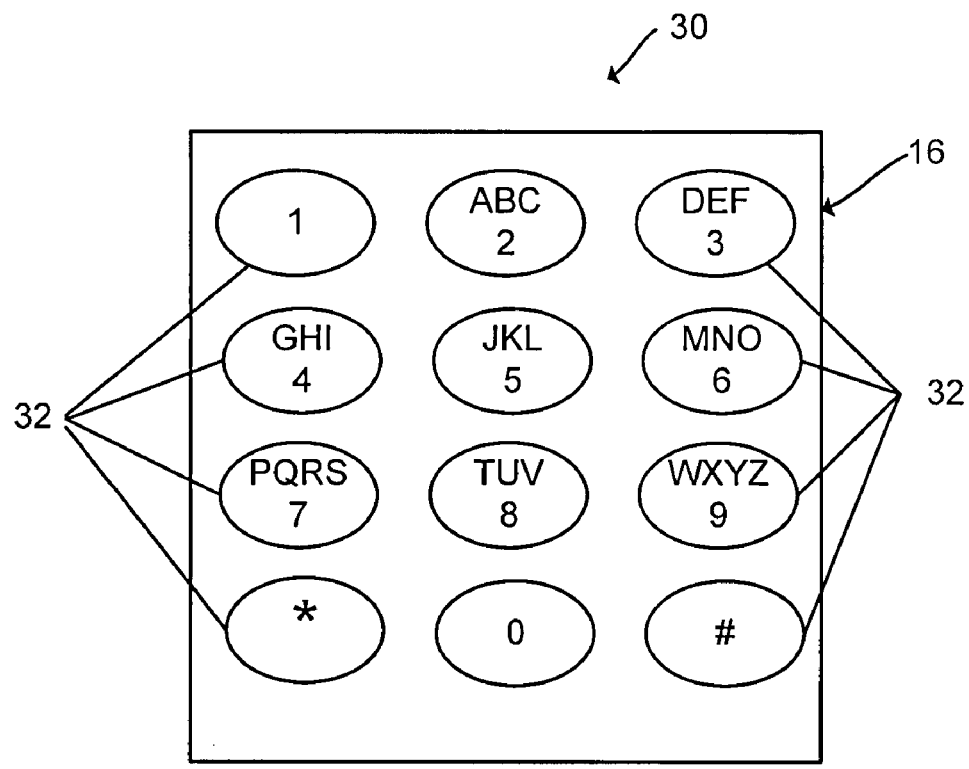
FIG. 3 is an exemplary user input device in accordance with aspects of the present invention.

The user interface 12 is also one mechanism for the user or operator of the electronic equipment 10 to enter characters, letters, words and/or expressions for use by one or more of the applications 26. For example, the user input device 30 may be any input device that allows a user to enter information (e.g., symbols, alphanumeric characters, words, phrases, graphic images, text images, etc.) into the electronic equipment 10. As shown in FIG. 3, the user input device 30 may be an alphanumeric keypad 16. The alphanumeric keypad 16 includes separate keys 32 for each of the numbers 0-9. The alphanumeric keypad 16 may also include keys that contain symbols (e.g. #, *, @, etc.). One of ordinary skill in the art will readily appreciate that the device display 14 may also be a user input device when properly equipped (e.g., a touch screen display).

The characters that comprise a particular alphabet may be distributed over the keys 32 of the alphanumeric keypad 16. For example, referring to FIG. 3, the twenty-six characters that comprise the English alphabet (e.g., letters A-Z) are distributed over eight of the ten keys that comprise the numerals. The user may enter one or more characters by pressing alphanumeric keys 32. One of ordinary skill in the art will readily appreciate that the alphanumeric keys illustrated are exemplary and may be suitably modified and/or altered based on a variety of design considerations including, for example, the language of user, country of user, a particular dialect, inclusion of a QWERTY user input device or other user input device, etc.

Typically, once a key is selected or entered, a representation of the symbol (also referred to herein as "user information") entered will be displayed on the display 14 in a user-sensible format (e.g., letter, word, phrase, image, graphical image, graphical character, text character, etc.).

Referring back to FIG. 2, the processor 28 also is coupled to a radio circuit 34. The radio circuit 34 may be used to establish communication in circuit-switched networks (e.g., for voice services, SMS, etc.) and also in packet-switched networks (e.g., VoIP, data services, chat sessions, etc.). One of ordinary skill in the art will readily appreciate that while the radio circuit 34 is depicted in a single box, one or more circuits may be used to perform the functionality described herein.

Figure 4:
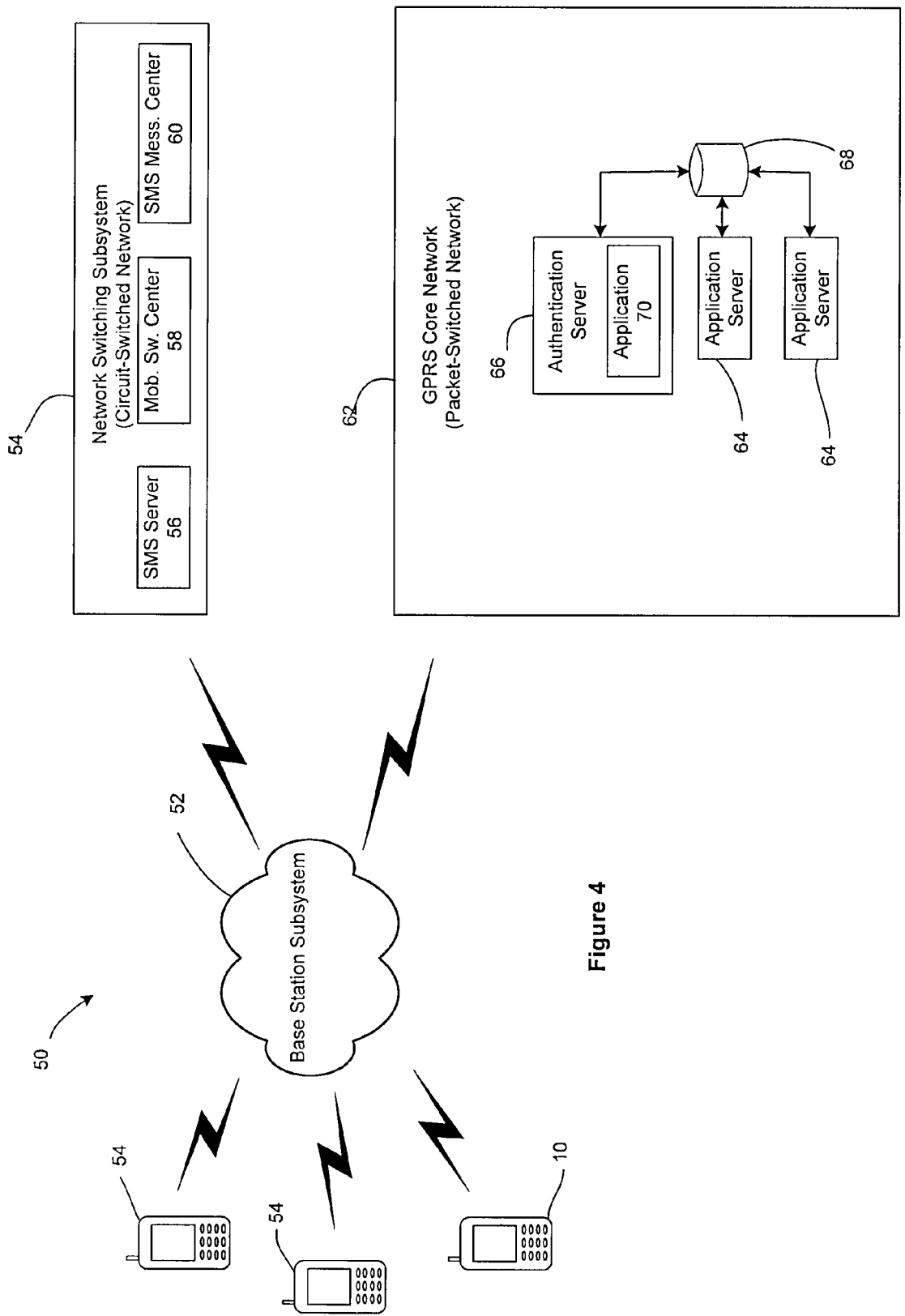
FIG. 4 is an exemplary network configuration in accordance with aspects of the present invention.

Referring to FIG. 4, an exemplary communication system 50 in accordance with aspects of the present invention is illustrated. The communication system 50 includes a base station subsystem 52. The base station subsystem is a section of a traditional mobile telephone network that is responsible for handling traffic and signaling between a mobile phone and the network switching subsystem (NSS) 54. The base station subsystem generally carries out transcoding of speech channels, allocation of radio channels to electronic equipment (e.g., mobile phones), paging, quality management of transmission and reception over the air interface and other tasks related to the radio network. The base station subsystem 52 is generally capable of receiving circuit-switched information and is also equipped to handle packet-switched information. The base station subsystem 54 is generally able to receive information from electronic equipment (10, 54) and transmit information destined to the electronic equipment (10, 54).

Circuit-switched information received is generally routed to the NSS 54. Such information includes voice communication, SMS, etc. The NSS 54 carries out switching functions and manages the communications between mobile phones and the public switched telephone network (PSTN). The NSS 54 is generally controlled by mobile telephone operators and allows mobile telephones to communicate with each other and telephones in the wider telecommunications network. The NSS 54 refers to the circuit-switched core network, used for traditional GSM services such as voice calls, SMS, and circuit switched data calls (e.g., non-TCP/IP data calls). One of ordinary skill in the art will readily appreciate that the NSS 54 includes such network components as, for example, a SMS server (56), mobile switching center (58), short message service center (60), etc, as is conventional.

The communication system 50 further includes a packet-switched network 62 that provides mobility management, session management and transport for Internet Protocol (IP) packet services. In a GSM network, the packet-switched network 62 includes the general packet radio services (GPRS) core network. As used herein, packet-switched means that multiple users share the same transmission channel, only transmitting when they have data to send. Thus the total available bandwidth can be immediately dedicated to those users who are actually sending at any given moment, providing higher use where users only send or receive data intermittently. Web browsing, receiving electronic mails as they arrive and instant messaging are examples of uses that require intermittent data transfers, which benefit from sharing the available bandwidth. By contrast, in circuit-switched connections, a connection establishes a circuit, and reserves the full bandwidth of that circuit during the lifetime of the connection. Usually, GPRS data are billed per kilobyte of information transferred, while circuit-switched data connections are billed per second. The latter is because even when no data is being transferred, the bandwidth is unavailable to other potential users.

The electronic equipment (10, 54) may interact with each other and/or the various network types in accordance with any suitable communication standard, including, but not limited to, Short Message Service (SMS), Advanced Mobile Phone Service (AMPS), Digital Advanced Mobile Phone Service (D-AMPS), Global System for Mobile Communications (GSM), Code Division Multiple Access (CDMA), wireless local area network (WLAN), Bluetooth or the like. In other words, the communication system 50 is illustrated in FIG. 4 for purposes of explaining aspects of the present invention, without limiting the invention to a particular communication system design, architecture or communication standard.

The packet-switched network 62 includes one or more application servers, which are indicated generally by the numeral 64, an authentication server 66 and a storage device 68, such as a memory for storing data accessible or otherwise usable by the application servers 18. The application servers 64 may be computer servers that serve a variety of functions in the communication system 50. For example, one or more of the application services may provide routing of TCP/IP information, packets, electronic mail, voice over Internet Protocol, Internet browsing, etc.

As is described more fully below, the authentication server 66 is operable to receive a request from one or more electronic equipment through a packet-switched network connection established between the authentication 66 and the electronic equipment. The authentication server 66 includes an application 70 that generates a unique identifier associated with the electronic equipment and/or the transport control protocol (TCP) port that receives the request. In one embodiment, the unique identifier is a hash code that is stored in a storage element 70 and/or a memory or storage device associated with the authentication server 66 as a representative of the TCP connection on the server associated with the request received from the electronic equipment 10 or any other suitable association. The hash code may be stored in any desirable manner. For example, the hash code may be stored in a database, linked list or any other desired mechanism. Once generated, the unique identifier may be transmitted to the requesting electronic equipment through the packet-switched connection.

The authentication server 66 is also operable to receive a SMS message from a SMS message center (SMSC) 60 or other suitable device through a circuit-switched network device, for example. Generally, the SMS message received by the authentication server 66 will include a first unique identifier generated by the authentication server 66 and a second unique identifier. The second unique identifier is generally contained in the header and/or body of the SMS message.

The second unique identifier may be, for example, a mobile subscriber integrated services digital network number (MSISDN). A MSISDN is a number (or value) uniquely identifying a subscription in a GSM or UMTS mobile network. The MSISDN is generally the telephone number to the subscriber identity module (SIM) (also known as a "SIM card"). The SIM card is a removable smart card for mobile cellular telephony devices such as mobile computers and mobile phones. SIM cards securely store the service-subscriber key (IMSI) used to identify a GSM subscriber. The SIM card allows users to change phones by simply removing the SIM card from one mobile phone and inserting it into another mobile phone or broadband telephony device. One of ordinary skill in the art will readily appreciate that the present invention is not limited to a SIM card and is also applicable to a removable user identity module (RUIM), and universal integrated circuit cards (UICCs) depending on the type of network that is the electronic equipment is configured to communicate. As used herein, MSISDN also refers to all other identity modules including, for example, RUIM, UICCs, a devices telephone number, etc.

As noted above, the electronic equipment 10 (also referred to as electronic equipment 54) is capable of sending messages (e.g., text messages) through SMS over a circuit-switched network and also chat over a packet-switched network. Typically, when a user desires to enter a text message, the user activates an application locally stored in the electronic equipment (10, 54) and the application initiates SMS service. One of ordinary skill in the art will readily appreciate that the various manufacturers of electronic equipment may provide different mechanisms (e.g., hardware and/or software) in order to activate SMS services on a particular electronic equipment.

Figure 5:
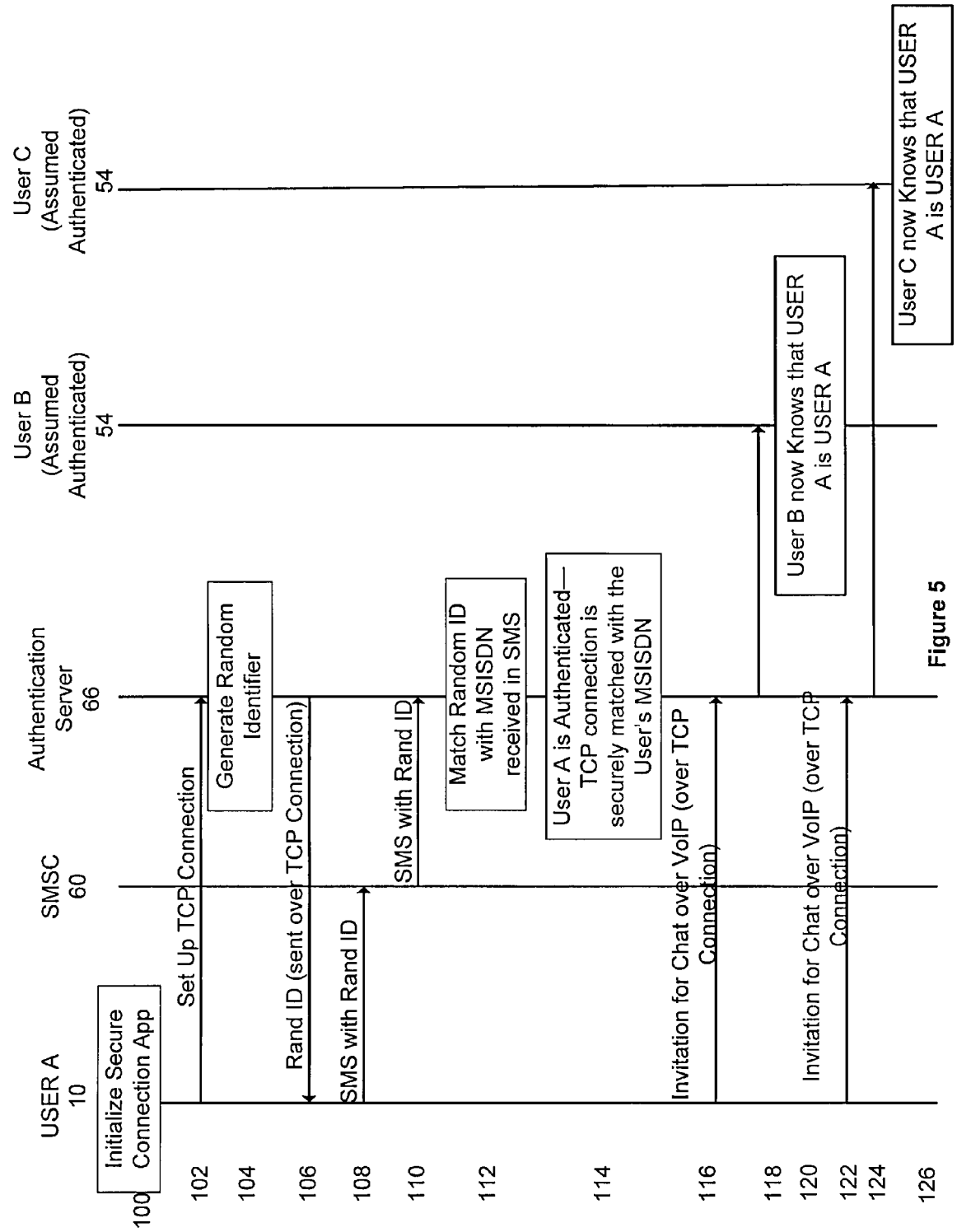
FIG. 5 is an exemplary method in accordance with aspects of the present invention.

Referring to FIG. 5, an exemplary method 100 in accordance with aspects of the present invention is illustrated. At block 100, the user activates an application and/or service that requires and/or allows an authenticated packet-switched network communications from the electronic equipment 10. At block 102, the electronic equipment 10 transmits a request through a packet-switched network connection to the authentication server 66. The authentication server 66 receives the request from the electronic equipment 10 through the packet-switched network and, at block 104, generates a unique identifier (e.g., a hash code, random code, etc.) based at least in part on the packet-switched network connection. The authentication server stores the hash code to later authenticate the electronic equipment. The hash code may be stored in any desirable manner. At block 106, the authentication server 66 transmits the unique identifier to the electronic equipment 10 through the packet-switched connection. The unique identifier is received at the electronic equipment through the packet-switched network connection and, at block 108, a SMS message is transmitted from the electronic equipment to a SMS server (or SMSC 60) through a circuit-switched network connection. The SMS message includes the first unique identifier generated by the authentication server 66 and a second unique identifier that is generally part of a conventional SMS message, for example. The request is received at the SMS server (and/or SMSC 60) and, at block 110, transmitted to the authentication server 66 for authentication of the electronic equipment on the authentication server 66.

At block 112, the SMS message with the unique identifier generated by the authentication server 66 and the unique identifier conventionally embedded in the message (e.g., MSISDN) is compared (or otherwise matched) by the authentication server 66 to ensure that the unique identifier generated by the SMS authentication sever 62 matches with the MSISDN received in the SMS message and/or the TCP connection associated with the electronic equipment matches the MSISDN received in the SMS message.

At block 114, if the two identifiers have been found to match, the electronic equipment 10 is authenticated and the packet-switched connection (e.g., TCP/IP) between the authentication server 66 and the electronic equipment 10 is enabled. If there is no match between the two identifiers and/or authentication fails for any other reason, then there user is not authenticated and access from the electronic equipment 10 to the authentication server 66 is denied.

At step 116, an invitation to communicate in a communication session may be transmitted from the electronic equipment 10 to one or more other electronic equipment 54 through the packet-switched connection. The invitation is generally transmitted to the authentication server 66, at step 116, and transmitted from the authentication 66 to the desired electronic equipment at step 118. At step 120, user B knows that the requesting party is actually the requesting party and not someone or entity spoofing the identity of the requesting party (e.g., User A).

Likewise at step 122, an invitation to communicate in a communication session may be transmitted from the electronic equipment 10 to one or more other electronic equipment 54 (e.g., User C) through the packet-switched connection. The invitation is generally transmitted to the authentication server 66, at step 122, and transmitted from the authentication 66 to the desired electronic equipment at step 124 and received by User C. At step 126, user C knows that the requesting party is actually the requesting party and not someone or entity spoofing the identity of the requesting party (e.g., User A).

The users of the other electronic equipment 54, in which communication is sought by electronic equipment, are assumed to be authenticated under the same conditions as set forth above for electronic equipment 10. Once the users are authenticated, the session may be established for packet-switched services (e.g., VoIP, chat session, etc.) directly over Internet Protocol through the authentication server 66.

The method disclosed above may be used in a wide variety of applications. For example, the authenticated connection established by an electronic equipment in the form of a mobile telephone may be transferred to an electronic equipment in the form of a personal computer. For example, once an electronic equipment is authenticated by the authentication server 66, the user of the authenticated electronic equipment may type in a web browser the authenticated server and user telephone number (or other unique identifier). The authentication server may perform a look up between the telephone number and the TCP connection of the authenticated electronic equipment. The authentication server may then transmit a message (e.g., "type 1234") to the authenticated electronic equipment over the TCP connection (packet-switched connection). The electronic equipment, the user types 1234 to approve that the web browser will act as if the web browser of the computer were located on the authenticated electronic equipment 10. Thereafter, the web browser on the computer will show the chat user interface. Until canceled by the user, the a chat session may now be started from the web browser of the personal computer 10 without an SMS message needed to be sent.

Another use case relates to a user having money and/or credit stored on the authenticated electronic equipment (e.g., a mobile telephone). If the user of the authenticated electronic equipment wants to buy an article (e.g., a music compact disc) on the Internet from his home personal computer, the merchant would like insurances that a party claiming to be a particular party, is in fact, that particular party. The method disclosed above would allow the web browser of the personal computer to borrow the identity of the authenticated electronic equipment. One of ordinary skill in the art will readily appreciate that the concept and methodology disclosed above may be used in accordance with a wide variety of Internet services, all of which are deemed to fall within the scope of the present invention.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

What is claimed is:

1. A method for establishing an authenticated network connection in a packet-switched network with an electronic equipment, the method comprising:
    transmitting a request from an electronic equipment through a packet-switched network connection to a first server;
    receiving a first unique identifier from the first server at the electronic equipment through the packet-switched network connection, wherein the first unique identifier is representative of a transport control protocol (TCP) connection between the electronic equipment and the first server;
    transmitting a message from the electronic equipment to a short message service (SMS) server through a circuit-switched network connection, wherein the message includes the first unique identifier and a second unique identifier, wherein if the first identifier and the second identifier are matched by the first server, the electronic equipment is authenticated and a packet-switched connection between the first server and the electronic equipment is enabled; and
    transmitting a communication request from the electronic equipment to an associated second electronic equipment through the first server via the packet-switched network connection.

2. The method of claim 1, wherein the first unique identifier is a random identifier generated by an application associated with the first server.

3. The method of claim 2, wherein the random identifier is a hash code.

4. The method of claim 3, wherein the hash code has a length of at least 128 bits.

5. The method of claim 3, wherein the second unique identifier is a mobile subscriber integrated services digital network number (MSISDN) associated with the electronic equipment.

6. The method of claim 5 further including the SMS server transmitting the message to the first server for authentication of the electronic equipment.

7. The method of claim 6, wherein the first server authenticates the electronic equipment by comparing the first unique identifier with the second unique identifier.

8. The method of claim 1 further including establishing a session between the first electronic equipment and the associated second electronic equipment through the packet-switched network connection.

9. The method of claim 8, wherein the session is at least one selected from the group consisting of a voice over Internet Protocol (VoIP) session, a chat session, or a data session.

10. The method of claim 1, wherein the electronic equipment is a portable communications device.

11. A method for establishing an authenticated network connection in a packet-switched network with an electronic equipment, the method comprising:
    receiving a request from an electronic equipment through a packet-switched network connection at a first server;
    generating a first unique identifier based at least in part on the packet-switched network connection;
    transmitting the first unique identifier from the first server to the electronic equipment through the packet-switched connection to the electronic equipment;
    receiving a message from a short message service (SMS) server through a circuit-switched network, wherein the message includes the first unique identifier and a second unique identifier, wherein the second unique identifier is associated with the electronic equipment;
    authenticating the electronic equipment by comparing the first unique identifier with the second unique identifier; and
    upon receiving a communication request from the electronic equipment, establishing a communication session between the electronic equipment and a second electronic equipment.

12. The method of claim 11, wherein the second unique identifier is a mobile subscriber integrated services digital network number (MSISDN) associated with the electronic equipment.

13. The method of claim 12, wherein the first unique identifier is a random identifier generated by the application associated with the first server.

14. The method of claim 13, wherein the random identifier is a hash code.

15. The method of claim 11, wherein the packet-switched connection utilizes a transport control protocol for communications between the electronic equipment and the second electronic equipment.

16. The method of claim 11, wherein the electronic equipment is a portable communications device.

17. A method for establishing an authenticated network connection in a packet-switched network with an electronic equipment, the method comprising:

receiving a request from an electronic equipment through a circuit-switched network at a short message service (SMS) server from an electronic equipment, wherein the request includes a first unique identifier generated by a first server in communication with the electronic equipment through a packet-switched connection and a second unique identifier associated with the electronic equipment; and transmitting the request to the first server for authentication of the electronic equipment on the first server authenticating the electronic equipment by comparing the first unique identifier with the second unique identifier; and upon receiving a communication request from the electronic equipment, establishing a communication session between the electronic equipment and a second electronic equipment.

* * * * *